(12) United States Patent
Deckers et al.

(10) Patent No.: US 6,583,418 B1
(45) Date of Patent: Jun. 24, 2003

(54) X-RAY DETECTOR

(75) Inventors: Jacobus A. J. M. Deckers, Eindhoven (NL); Maarten Van Vliet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/483,977

(22) Filed: Jan. 18, 2000

(30) Foreign Application Priority Data

Jan. 19, 1999 (EP) .............................. 99200127

(51) Int. Cl.⁷ .................... G01T 1/24; H01L 25/00; H01L 27/00
(52) U.S. Cl. ................. 250/370.01; 250/370.09
(58) Field of Search ................. 257/628, 691; 250/370.09, 370.01, 352; 438/106, 121

(56) References Cited

U.S. PATENT DOCUMENTS

| | | | | |
|---|---|---|---|---|
| 4,983,840 A | * | 1/1991 | Ouvrier-Buffet et al. | ... 250/352 |
| 5,510,623 A | * | 4/1996 | Sayag et al. | ........... 250/370.09 |
| 5,648,674 A | * | 7/1997 | Weisfield et al. | ....... 250/370.09 |
| 5,894,129 A | * | 4/1999 | Pool | ...................... 250/370.09 |
| 6,163,071 A | * | 12/2000 | Yamamura | .................. 257/691 |
| 6,169,781 B1 | * | 1/2001 | Doebert et al. | ............. 378/189 |

* cited by examiner

*Primary Examiner*—Georgia Epps
*Assistant Examiner*—Alicia Harrington
(74) *Attorney, Agent, or Firm*—John Vodopia

(57) ABSTRACT

An image receiving device for an X-ray detector including a carrier plate having at least one rounded corner, a sensor arranged on the carrier plate and having at least one side proximate the rounded corner, and signal lines extending from the side of the sensor proximate the rounded corner. The signal lines are connected to the carrier plate and define an acute angle with the side of the sensor proximate the rounded corner. The sensor is structured and arranged such that an image is receivable by an entire surface thereof.

5 Claims, 2 Drawing Sheets

X-RAY DETECTOR

BACKGROUND OF THE INVENTION

1. Field of the Invention

The invention relates to an X-ray detector which includes a plate-shaped image pick-up device which is provided with a sensor and has at least one rounded corner, the sensor being provided with at least one signal line which extends from at least one side of the sensor.

2. Description of Related Art

A signal line is to be understood to mean herein an electrically conductive signal line or signal wire.

The sensor of the image pick-up device in an X-ray detector of this kind which is known from EP-B1-0.714.632, has an octagonal shape so that it can be positioned in a comparatively small housing having rounded corners. The X-ray detector described in EP-B1-0.714.632 is used to form X-ray images of the teeth in the mouth of a patient. The rounded corners serve to prevent damaging of the oral cavity. The sensor disclosed in EP-B1-0.714.632 includes, near its center, a read-out register whereto various segments of the sensor are connected. Connection lines for connecting the sensor to, for example an image processing device extend from a side of the sensor. It is a drawback of the known sensor that the part occupied by the read-out register cannot act as a sensor. As a result, the sensor can produce only an interrupted image.

Citation of a reference herein, or throughout this specification, is not to construed as an admission that such reference is prior art to the Applicant's invention of the invention subsequently claimed.

SUMMARY OF THE INVENTION

It is an object of the invention to provide an X-ray detector in which the sensor can produce an uninterrupted image, it nevertheless being possible for the image pick-up device to have rounded corners so that it can still be accommodated in a comparatively small housing.

This object is achieved in the X-ray detector according to the invention in that the signal lines extending from at least the side of the sensor are connected to a carrier plate provided with the rounded corner, the signal lines enclosing an acute angle relative to the side near the rounded corner. These signal lines are employed to read-out signals from the sensor and/or to apply control signals to the sensor.

In the sensor according to the invention, all necessary signal lines are situated along one or more sides of the sensor so that an image can be formed by means of the entire surface of the sensor. Because, moreover, near the rounded corner of the carrier plate the signal lines enclose an acute angle relative to the side of the sensor, all required signal lines can be arranged on the carrier plate provided with the rounded corners.

A rounded corner of the carrier plate is to be understood to mean herein a corner of given radius, with chamfered edge portions, and any other shape whereby a right-angled corner of a carrier plate is avoided.

Because the carrier plate is provided with rounded corners, it can be accommodated in a comparatively small housing. A comparatively small housing is desirable because the maneuverability and positionability of the entire X-ray detector are thus enhanced. This is particularly important for cardiological and vascular applications.

Embodiments of the X-ray detector according to the invention are characterized in that near the rounded corner each of at least two lines encloses an acute angle relative to the side, the acute angles being equally large or smaller as the distance from the rounded corner is greater.

Depending on the desired further course of the signal lines, the angles may be either equal or different.

A further embodiment of the X-ray detector according to the invention is characterized in that beyond a predetermined distance from the rounded corner the signal lines, extending from the sensor at an acute angle relative to the side, further extend transversely of the side.

This enables connection of the signal lines at a side which is remote from the sensor to a coupling piece which extends parallel to the side of the sensor, for example a flexible foil provided with lines.

BRIEF DESCRIPTION OF THE DRAWING

The invention will be described in detail hereinafter with reference to the drawing; therein

Corresponding components in the Figures are denoted by corresponding reference numerals.

DETAILED DESCRIPTION OF THE PREFERRED EMBODIMENT

Figure 1:
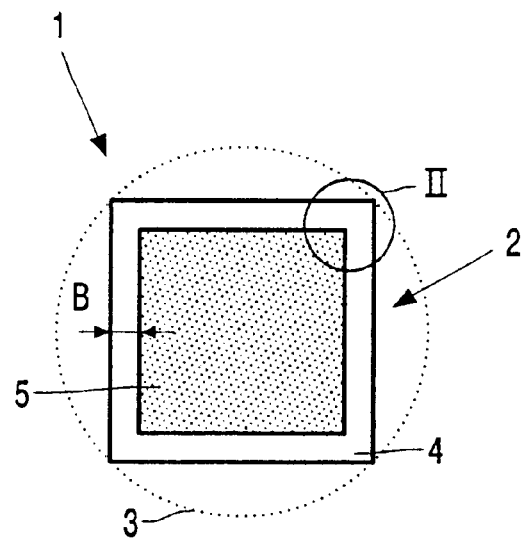
FIG. 1 is a plan view of a known X-ray detector with a square carrier plate.
Figure 2:
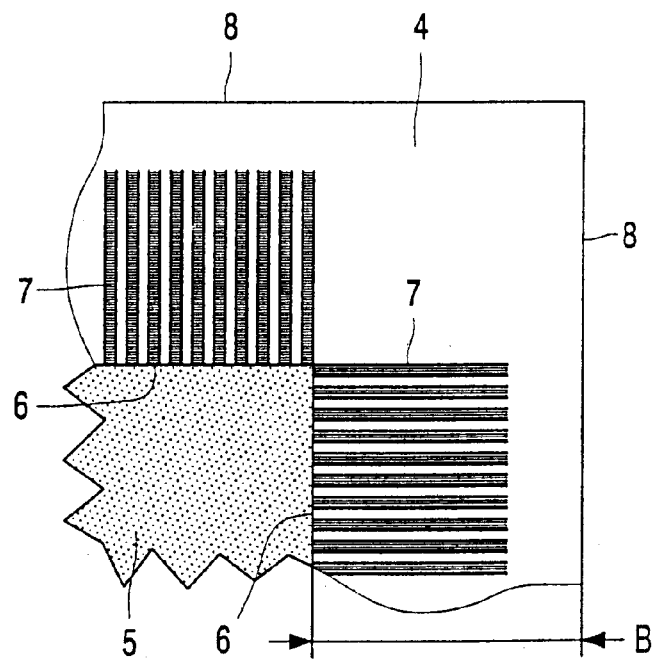
FIG. 2 shows a detail of the X-ray detector shown in FIG. 1.

FIGS. 1 and 2 show a known X-ray detector 1 which includes a square image pick-up device 2 which may be accommodated in a housing 3 denoted by a dashed line. The image pick-up device 2 includes a square glass carrier plate 4 which supports a square sensor 5 which is made of amorphous silicon. Along sides 6, the sensor 5 is provided with signal lines 7 which extend transversely of the associated side 6. At a side which is remote from the sensor 5 the signal lines 7 can be coupled to, for example a coupling piece (not shown) which may include a flexible coil provided with lines. In order to accommodate the signal lines 7 on the carrier plate 4, the sensor 5 is situated at a distance B from the sides 8 of the carrier plate 4. If the carrier plate 4 is to be accommodated in a circular housing 3, the diameter of the circular housing 3 is determined by the diagonal of the sensor plus $2\sqrt{2}B$. The distance B is of the order of magnitude of from 20 to 30 mm, so that a saving of from 55 mm to 85 mm in respect of the diameter of the circular housing can be realized.

Figure 3:
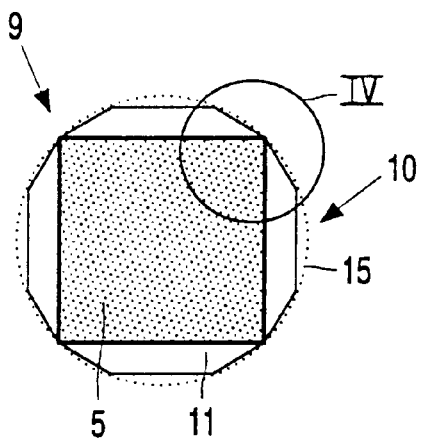
FIG. 3 is a plan view of an X-ray detector according to the invention.
Figure 4:
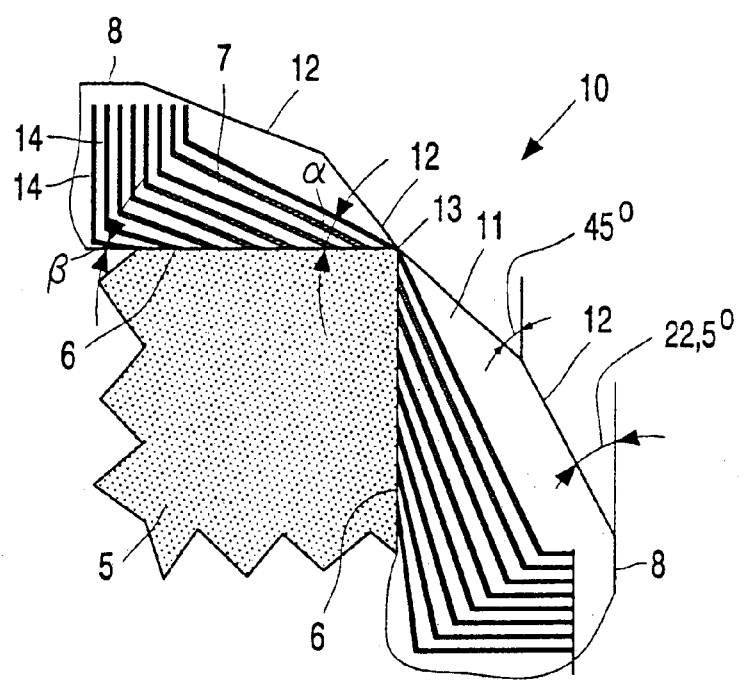
FIG. 4 shows a detail of the X-ray detector shown in FIG. 3.

FIGS. 3 and 4 show an X-ray detector 9 according to the invention which is provided with an image pick-up device 10 which includes a glass carrier plate 11 and a sensor 5 which is arranged thereon and is made of an amorphous silicon. The sensor 5 has the same dimensions as the sensor 5 of the X-ray detector 1 shown in FIG. 1. Near each corner the carrier plate 11 has three consecutive edge portions 12 which enclose an angle of 22.5° relative to the adjacent side 8 and/or the adjacent edge portion 12. Near the corners 13 of the sensor 5 the signal lines 7 are provided on the carrier plate 11 in such a manner that they enclose an acute angle relative to the associated side 6 of the sensor 5. At a distance from the corner 13 of the sensor 5 the signal lines 7 have portions which extend transversely of the associated side 6. As a result, near the side 8 of the carrier plate 1 the signal lines 7 can be connected to a coupling piece in a manner similar to that described with reference to FIG. 1. In the image pick-up device 10 shown in FIG. 4 the signal line 7 which is situated nearest to the corner 13 of the sensor 5 encloses an angle relative to the side 6 which is larger than the angle β enclosed relative to the side 6 by a signal line 7 situated at a distance from the corner 13. However, all signal lines 7 may alternatively enclose the same angle α relative to the side 6. Preferably, the signal lines 7 are provided on the carrier plate 11 in such a manner that the distance between the portions 14 of the signal lines 7 is the same everywhere. If the image pick-up device 10 is to be accommodated in a circular housing 15, as a result of the rounded corners of the carrier plate 11 the diameter of the housing 15 will be determined exclusively by the diagonal of the sensor 5.

Evidently, it is alternatively possible to provide the carrier plate 11 with more edge portions 12 or with a circular edge portion.

Evidently, it is also possible to conduct the signal lines in smooth curves from the sensor to an edge of the carrier plate which is situated at a distance from the sensor.

All references cited herein, as well as the priority document European Patent Application 99200127.1 filed Jan. 19, 1999, are incorporated herein by reference in their entirety and for all purposes to the same extent as if each individual publication or patent or patent application was specifically and individually indicated to be incorporated by reference in its entirety for all purposes.

What is claimed is:

1. An X-ray detector including an image receiving device, said image receiving device comprising:

a carrier plate having at least one rounded corner, a sensor arranged on said carrier plate and having a first side proximate said at least one rounded corner, said sensor being structured and arranged such that an image is receivable by an entire surface of said sensor, and signal lines extending from at least two sides of said sensor, said signal lines being connected to said carrier plate and defining an acute angle with a first side of said at least two sides of said sensor, wherein near said at least one rounded corner of said carrier plate each of at least two of said signal lines define an acute angle with said first side of said sensor, the acute angle being smaller as the distance from said at least one rounded corner is greater.

2. An X-ray detector including an image receiving device, said image receiving device comprising:

a carrier plate having at least one rounded corner, a sensor arranged on said carrier plate and having a first side proximate said at least one rounded corner, said sensor being structured and arranged such that an image is receivable by an entire surface of said sensor, and signal lines extending from at least two sides of said sensor, said signal lines being connected to said carrier plate and defining an acute angle with a first side of said at least two sides of said sensor, wherein a second side of said at least two sides is proximate said at least one rounded corner and forms an angle with said first side, further comprising additional signal lines extending from said second side of said sensor, connected to said carrier plate and defining an acute angle with said second side of said sensor.

3. An X-ray detector including an image receiving device, said image receiving device comprising:

a carrier plate having at least one rounded corner, a sensor arranged on said carrier plate and having a side proximate said at least one rounded corner, and signal lines extending from said side of said sensor, said signal lines being connected to said carrier plate and defining an acute angle relative to said side of said sensor, each of at least two of said signal lines defining an acute angle relative to said side of said sensor proximate said at least one rounded corner of said carrier plate, the acute angle being smaller as the distance from said at least one rounded corner is greater.

4. An X-ray detector including an image receiving device, said image receiving device comprising:

a carrier plate having rounded corners, a sensor arranged on said carrier plate and having first and second sides each proximate one of said rounded corners, first signal lines extending from said first side of said sensor, said first signal lines being connected to said carrier plate and defining an acute angle relative to said first side of said sensor, and second signal lines extending from said second side of said sensor, said second signal lines being connected to said carrier plate and defining an acute angle relative to said second side of said sensor, and second signal lines extending from said second side of said sensor, said second signal lines being connected to said carrier plate and defining an acute angle relative to said second side of ssid sensor.

5. An X-ray detector as claimed in claim 4, wherein said first and second sides of said sensor are adjacent one another.

* * * * *